(12) United States Patent
Stattin et al.

(10) Patent No.: US 10,187,837 B2
(45) Date of Patent: *Jan. 22, 2019

(54) METHOD AND APPARATUS FOR SEAMLESS HANDOVER IN A WIRELESS COMMUNICATION NETWORK

(71) Applicant: Telefonaktiebolaget LM Ericsson (publ), Stockholm (SE)

(72) Inventors: Magnus Stattin, Upplands Väsby (SE); Michael Meyer, Aachen (DE); Janne Peisa, Espoo (FI); Ghyslain Pelletier, Laval (CA); Mats Fredrik Sågfors, Kyrkslätt (FI); Per Johan Torsner, Masaby (FI); Henning Wiemann, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/832,134

(22) Filed: Dec. 5, 2017

(65) Prior Publication Data

US 2018/0098257 A1    Apr. 5, 2018

Related U.S. Application Data

(63) Continuation of application No. 15/229,412, filed on Aug. 5, 2016, now Pat. No. 9,877,252, which is a (Continued)

(30) Foreign Application Priority Data

Apr. 25, 2007   (SE) ...................................... 0701011

(51) Int. Cl.
*H04W 4/02* (2018.01)
*H04W 36/18* (2009.01)
(Continued)

(52) U.S. Cl.
CPC ........... *H04W 36/18* (2013.01); *H04L 5/0055* (2013.01); *H04W 36/02* (2013.01); *H04W 36/08* (2013.01);
(Continued)

(58) Field of Classification Search
CPC ..... H04W 36/30; H04W 80/04; H04W 28/18; H04L 61/6004; H04L 61/6022
(Continued)

(56) References Cited

U.S. PATENT DOCUMENTS 5,570,367 A    10/1996  Ayanoglu et al.
2002/0141360 A1  10/2002  Baba et al.
(Continued)

FOREIGN PATENT DOCUMENTS

EP    1871055 A2    12/2007
EP    1915019 A1    4/2008
(Continued)

OTHER PUBLICATIONS

Nokia. "Way forward for user plane data handling and ciphering location." 3GPP TSG-RAN WG2 Meeting #57bis, R2-071590, St. Julian's, Malta, Mar. 26-30, 2007, pp. 1-5.
(Continued)

*Primary Examiner* — Phuoc H Doan
(74) *Attorney, Agent, or Firm* — Coats & Bennett, PLLC

(57) ABSTRACT

A mobile station is configured to support handover from a source base station to a target base station. The mobile station receives signaling from the target base station that indicates Packet Data Convergence Protocol (PDCP) protocol data units which have been successfully received at the target base station. In response, the mobile station generates further PDCP protocol data units for missing PDCP service data units from corresponding PDCP service data units buffered at the mobile station. The generating comprises
(Continued)

using a different header compression state from that which was used for the missing PDCP service data units and ciphering specific to a connection with the target base station. The mobile station transmits the further PDCP protocol data units to the target base station.

20 Claims, 4 Drawing Sheets

Related U.S. Application Data continuation of application No. 14/340,654, filed on Jul. 25, 2014, now Pat. No. 9,426,710, which is a continuation of application No. 13/567,173, filed on Aug. 6, 2012, now Pat. No. 8,818,375, which is a continuation of application No. 12/596,692, filed as application No. PCT/SE2008/050468 on Apr. 23, 2008, now Pat. No. 8,265,628.

(51) Int. Cl.
  *H04W 36/02* (2009.01)
  *H04L 5/00* (2006.01)
  *H04W 36/08* (2009.01)
  *H04L 1/18* (2006.01)
  *H04L 12/801* (2013.01)
  *H04W 88/16* (2009.01)

(52) U.S. Cl.
  CPC ............ *H04L 1/1867* (2013.01); *H04L 47/34* (2013.01); *H04W 88/16* (2013.01)

(58) Field of Classification Search
  USPC ........... 455/404.2, 412.1, 440, 445; 370/417, 370/469, 401, 329
  See application file for complete search history.

(56) References Cited

U.S. PATENT DOCUMENTS

| | | |
|---|---|---|
| 2004/0081119 A1 | 4/2004 | Zhong et al. |
| 2005/0039101 A1 | 2/2005 | Torsner |
| 2005/0094586 A1 | 5/2005 | Zhang et al. |
| 2005/0286470 A1 | 12/2005 | Asthana et al. |
| 2007/0230401 A1 | 10/2007 | Rayzman et al. |
| 2008/0019320 A1* | 1/2008 | Phan ............... H04W 36/02 370/331 |
| 2008/0104968 A1 | 5/2008 | Radovinsky et al. |
| 2008/0119189 A1 | 5/2008 | Chang et al. |
| 2010/0150110 A1 | 6/2010 | Dutta et al. |
| 2012/0002642 A1 | 1/2012 | Dick et al. |

FOREIGN PATENT DOCUMENTS

| | | |
|---|---|---|
| JP | H0865355 A | 3/1996 |
| JP | 2007503779 A | 2/2007 |
| JP | 2010506134 A | 2/2010 |
| WO | 2005074308 A1 | 8/2005 |
| WO | 2006116620 A2 | 11/2006 |
| WO | 2007004051 A1 | 1/2007 |
| WO | 2007008465 A1 | 1/2007 |

OTHER PUBLICATIONS

LG Electronics. "SDU Handling During Inter eNB Handover." 3GPP TSG-RAN WG2 #56, R2-063247, Riga, Latvia, Nov. 6-10, 2006, pp. 1-7.

Huawel. "comments to "Key refresh in SAE/LTE"." 3GPP TSG SA WG3 Security—SA3#46b, S3-070272, Sophia Antipolis, Mar. 28-29, 2007, pp. 1-7.

LTE Rapporteurs. "LTE related topics to be considered during SAE/LTE NW architecture consolidation." 3GPP TSG RAN Joint SA2/RAN2/RAN3 Meeting, R3-070383, St. Louis, USA, Feb. 12-16, 2007, pp. 1-5.

NTT Docomo, Inc. "E-mail discussion on data handling at handover." 3GPP TSG-RAN WG2 Meeting #57bis, R2-071294, St. Julian's, Malta, Mar. 26-30, 2007, pp. 1-10.

Ayanoglu, E., et al., "Airmail: A Link-Layer Protocol for Wireless Networks," Wireless Networks, Mar. 1995, vol. 1, Issue 1, Aug. 27, 1994, pp. 47-60.

\* cited by examiner

METHOD AND APPARATUS FOR SEAMLESS HANDOVER IN A WIRELESS COMMUNICATION NETWORK

This application is a continuation of U.S. application Ser. No. 15/229,412, filed 5 Aug. 2016, which is a continuation of U.S. application Ser. No. 14/340,654, filed 25 Jul. 2014, now U.S. Pat. No. 9,426,710 issued on 23 Aug. 2016, which is a continuation of U.S. application Ser. No. 13/567,173, filed 6 Aug. 2012, now U.S. Pat. No. 8,818,375 issued on 26 Aug. 2014, which is a continuation of U.S. application Ser. No. 12/596,692, filed 20 Oct. 2009, now U.S. Pat. No. 8,265,628 issued on 11 Sep. 2012, which was the National Stage of International Application No. PCT/SE2008/050468, filed 23 Apr. 2008, which claims priority to Swedish patent application 0701011-9, filed 25 Apr. 2007, the disclosures of each of which are hereby incorporated by reference in their entireties.

TECHNICAL FIELD

This present invention generally relates to wireless communication networks, and particularly relates to seamless handover in such networks.

BACKGROUND

In a cellular system, mobile terminals are handed over between base stations. It is preferable that the change of the base-station occurs seamlessly for the user. In particular, seamless handover minimizes or at least reduces interruption time, and prevents data losses and sequencing issues.

The Long Term Evolution (LTE) System currently standardized in 3GPP—see TS 36.300 v8.0.0, 3GPP; Technical Specification Group Radio Access Network; Evolved Universal Terrestrial Radio Access (E-UTRA) and Evolved Universal Terrestrial Radio Access Network (E-UTRAN); Overall description; Stage 2, March 2007—provides for movement of network users between cells. More particularly, the specification includes Layer 2 (L2) provisions related to providing seamless handover. These L2 protocols include the Medium Access Control (MAC) protocol (with Hybrid Automatic Repeat Request (HARQ) provisions), the Radio Link Control (RLC) protocol (with ARQ provisions), and the Packet Data Convergence Protocol (PDCP).

In a known implementation, a (core) network gateway or other packet data entity delivers PDCP service data units to a base station for downlink delivery to a mobile station. The base station processes these service data units, such as by applying header compression and base-station specific ciphering, to obtain PDCP protocol data units that are transmitted in sequence over the air interface to the mobile station. The mobile station receives these PDCP protocol data units and processes them to recover the corresponding PDCP service data units. Notably, the protocol data units include sequence number information, which allows the mobile station to detect missed protocol data units and correspondingly reorder data as needed to ensure that the mobile station processes the service data units in their proper sequence.

Conversely, for uplink transmissions from the mobile station to the base station, the mobile station processes PDCP service data units originating at the mobile station, to obtain corresponding PDCP protocol data units, which are sequentially transmitted over the air interface to the base station. The base station processes these received PDCP protocol data units to obtain the corresponding PDCP service data units, and uses the sequence numbers to detect missing data and to conduct reordering as needed for proper sequential transfer of the uplink PDCP service data units to the core network.

Reception errors at the base station (and mobile station) can result in out-of-sequence reception. For example, the base station may receive two PDCP protocol data units in sequence, miss a third one, and successfully receive a fourth one. That fourth one cannot be processed for transfer to the core network until the missing third PDCP protocol data unit is successfully received at the base station. The base station thus buffers out-of-sequence data, holding it for reordering upon subsequent receipt of the missing data, which may be retransmitted according to known ARQ/HARQ processes in the MAC and RLC layers. The possibility of out-of-sequence data reception adds potentially significant complications to mobile station handover, where the mobile station is handed over from its current base station to a new base station.

SUMMARY

In a wireless communication network where base stations receive protocol data units from mobile stations for ordered, sequential transfer as service data units to an associated core network, the teachings presented herein provide a method of supporting seamless handover of a mobile station from a source base station to a target base station. By way of example, the teachings herein apply to a wireless communication network based on the Evolved Universal Terrestrial Radio Access (E-UTRA) specifications, as promulgated by the Third Generation Partnership Project (3GPP). For example, the protocol data units may comprise Packet Data Convergence Protocol (PDCP) protocol data units and the service data units may comprise PDCP service data units. However, such examples should be understood as non-limiting, as the teachings herein essentially apply to any wireless communication network that employs in-sequence data delivery and duplicate data detection at handover, e.g. at radio base stations within the radio access portion of the network.

In one embodiment, the teachings herein provide a method of handover processing at a target base station, where the method supports seamless handover of a mobile station from a source base station to the target base station. In at least one such embodiment, the method comprises, during handover execution, receiving at the target base station service data units and sequence number information forwarded from the source base station. The forwarded service data units are those service data units being held at the source base station for sequential transfer to the associated core network, i.e., out-of-sequence service data units, and the forwarded sequence number information indicates the sequence numbers corresponding to the forwarded service data units. As used here, sequence numbers corresponding to service data units simply are the sequence numbers of the protocol data units corresponding to those service data units.

The method continues with reordering the forwarded service data units as needed at the target base station for sequential transfer from the target base station to the associated core network. In this manner, re-sequencing functions are contained within the radio access portion of the wireless communication network, e.g., at the base station, and it is not necessary for the associated core network to have re-sequencing capabilities.

Such protocol and service data units may comprise, for example, PDCP protocol and service data units. In at least one such embodiment, the source base station deciphers and decompresses (if header compression is used) protocol data units incoming from a mobile station, to obtain corresponding service data units for in-sequence transfer to the associated core network. If protocol data units are received out of sequence at the source base station, the corresponding service data units are held there for re-sequencing. Such buffered service data units are forwarded to a target base station, if handover to the target base station is initiated for the corresponding mobile station.

Thus, in at least one embodiment, the teachings herein provide a method of handover processing at a source base station, where the method supports seamless handover of a mobile station from the source base station to a target base station. The method is characterized by, during handover execution, forwarding from the source base station to the target base station service data units and sequence number information. The forwarded service data units are those service data units being held at the source base station for sequential transfer to the associated core network, and the forwarded sequence number information corresponds to the forwarded service data units. In this manner, the service data units being held at the source base station because of out-of-sequence protocol data unit receipt are forwarded to the target base station in support of handover execution, along with an indication of the sequence numbers of the corresponding protocol data units.

Further, the forwarded sequence number information includes in at least one embodiment an indication of the sequence number for the protocol data unit corresponding to the service data unit most recently transferred from the source base station to the associated core network. Additionally or alternatively, the forwarded sequence number information can include sequence number corresponding to the next service data unit expected to be delivered in-sequence from the source base station to the associated core network. As such, the target base station can conveniently process the forwarded sequence number information to identify missing service data units.

A mobile station is also provided according to the teachings presented herein. In one embodiment, a mobile station is configured for use in a wireless communication network wherein the mobile station transmits protocol data units to a base station and the base station transfers corresponding service data units to an associated core network. The mobile station configured for supporting seamless handover from a source base station to a target base station, and is characterized by a handover processor. The handover processor of the mobile station is operative to regenerate new protocol data units for missing service data units and transmit the regenerated protocol data units responsive to signaling from the target base station. The regenerated protocol data units are regenerated from corresponding service data units buffered at the mobile station and the (target base station) signaling indicates which service data units are missing at the target base station or equivalently indicates which service data units have been successfully received at the target base station. For example, such signaling may include explicit retransmission requests, and/or may include the transmission of a status or other message from the target base station that indicates which service data units have been successfully received at the target base station, or which ones are missing at the target base station.

Of course, the present invention is not limited to the above summary of features and advantages. Indeed, those skilled in the art will recognize additional features and advantages upon reading the following detailed description, and upon viewing the accompanying drawings.

DETAILED DESCRIPTION

Figure 1:
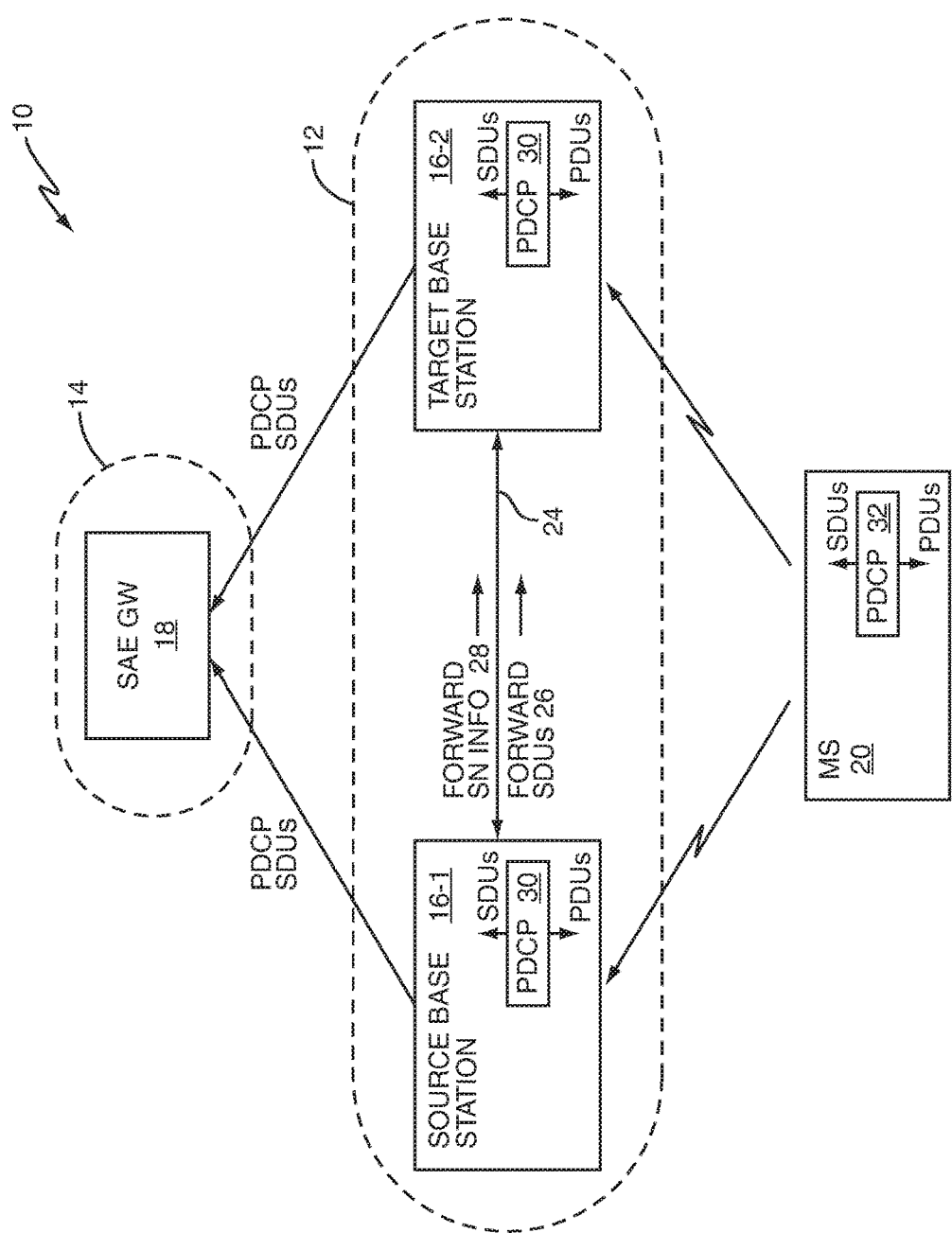
FIG. 1 is a block diagram of one embodiment of a wireless communication network, including source and target base stations configured according to an embodiment of seamless handover as taught herein.

FIG. 1 illustrates a wireless communication network 10 that may be, but is not limited to, an E-UTRAN network that is configured according to the relevant 3GPP specifications. The network 10 includes a radio access network (RAN) 12, and an associated core network 14. The RAN 12 includes a number of radio base stations 16, which may be, for example, "evolved Node Bs," also referred to as eNBs. The core network 14 includes a packet data gateway 18, such as a "System Architecture Evolution (SAE) Gateway (GW)."

With emphasis on processing features and configurations related to seamless handover of a mobile station 20 from one base station 16 to another, FIG. 1 illustrates one base station 16 playing the role of "source base station," and another base station 16 playing the role of "target base station." For ease of discussion, the source base station 16 is denoted as source base station 16-1 and the target base station 16 is denoted as target base station 16-2.

Focusing particularly on uplink communications flowing from the mobile station 20 to the gateway 18 via the base stations 16, one sees that the mobile station 20 includes a Packet Data Convergence Protocol (PDCP) processor 32, and that the base stations 16 include corresponding PDCP processors 30. Assuming that the source base station 16-1 currently is supporting uplink communications from the mobile station 20, the mobile station 20 transmits packet data to the gateway 18 based on forming PDCP protocol data units—often referred to as "protocol data units"—based on ciphering and (optionally) compressing PDCP service data units—often referred to as "service data units". For example, uplink packet data to be transmitted from the mobile station 20 to the gateway 18 is formatted into PDCP service data units, which are then processed into PDCP protocol data units for over-the-air transmission to the source base station 16-1.

In turn, the source base station 16-1 processes the received PDCP protocol data units to obtain corresponding PDCP service data units, which it then transfers to the gateway 18. Because the PDCP service data units should be transferred to the gateway in order of transmission sequence, the PDCP uplink processing includes assigning sequence numbers to the transmitted PDCP protocol data units. In this manner, the source base station 16-1 may identify PDCP protocol data units that are received out of sequence at the source base station 16-1. The source base station 16-1 may temporarily buffer the PDCP Service data units corresponding to the out-of-sequence PDCP protocol data units. Among other advantages, the teachings presented herein provide advantageous source and target base station processing wherein such buffered PDCP service data units are forwarded from the source base station 16-1 to the target 16-2 in support of seamless handover of the mobile station 20 from the source base station 16-1 to the target base station 16-2.

More particularly, according to one or more embodiments taught herein, an interface 24 communicatively couples the source base station 16-1 to the target base station 16-2, and that interface 24 is used by the source base station 16-1 to forward service data units and corresponding sequence number information to the target base station 16-2 during handover execution. These forwarded service data units are identified by reference number "26" and the sequence number information is identified by reference number "28" in FIG. 1. The forwarded service data units 26 are those service data units that correspond to protocol data units received out of sequence at the source base station 16-1 and that have not been transferred to the gateway 18. In other words, the forwarded service data units 26 are those service data units being held at the source base station 16-1 for sequential transfer to the gateway 18. Correspondingly, the sequence number information 28 indicates at least sequence numbers corresponding to the forwarded service data units. In other words, the forwarded sequence number information indicates the sequence numbers of the out-of-sequence protocol data units corresponding to the forwarded service data units 26. Alternatively, the sequence number information 28 may include sequence numbers corresponding to the missing service data units.

Thus, as taught herein in one or more embodiments, a method of supporting seamless handover of a mobile station 20 from a source base station 16-1 to a target base station 16-2 is characterized by, during handover execution, receiving at the target base station 16-2 service data units and sequence number information forwarded from the source base station 16-1. The forwarded service data units comprise service data units being held at the source base station 16-1 for sequential transfer to the associated core network 14 and the forwarded sequence number information indicates sequence numbers corresponding to the forwarded service data units. The method continues with reordering the forwarded service data units as needed at the target base station 16-2 for sequential transfer from the target base station 16-2 to the associated core network 14.

In at least one embodiment, reordering the forwarded service data units as needed at the target base station 16-2 for sequential transfer from the target base station 16-2 to the associated core network 14 includes the target base station 16-2 identifying missing service data units based on the forwarded sequence number information, and requesting retransmission by the mobile station 20 of the protocol data units corresponding to the missing service data units. In at least one such embodiment, the method is further characterized by the target base station 16-2 receiving the retransmitted protocol data units and processing them to obtain the missing service data units, and reordering the thus obtained service data units with the forwarded service data units as needed for sequential transfer to the associated core network 14.

The method is further characterized in one or more embodiments in that the target base station 16-2 processes the forwarded sequence number information to identify protocol data units received at the target base station 16-2 from the mobile station 20 that are duplicative with regard to service data units previously transferred from the source base station 16-1 to the associated core network 14. The target base station 16-2 also processes the forwarded sequence number information to identify protocol data units for which retransmission by the mobile station is required for reordering of the forwarded service data units for sequential transfer from the target base station 16-2 to the associated core network 14.

In at least one embodiment, forwarded service data units are successfully deciphered versions of corresponding protocol data units that were received out of sequence at the source base station 16-1 at or before initiation of handover and have not been transferred as service data units from the source base station 16-1 to the associated core network 14. Note that in such embodiments, or in at least one other embodiment, the forwarded service data units are successfully deciphered and decompressed versions of corresponding protocol data units that were received out of sequence at the source base station 16-1 at or before initiation of handover and have not been transferred as service data units from the source base station 16-1 to the associated core network 14. Note, too, that in at least one embodiment of the method, the forwarded sequence number information indicates the sequence number corresponding to the service data unit most recently transferred from the source base station 16-1 to the associated core network 14, or indicates the sequence number corresponding to a last in sequence received service data unit, or indicates the sequence number corresponding to the service data unit next expected to be transferred from the source base station 16-1 to the associated core network 14. (The "last in sequence received service data unit" denotes the last service data unit received in sequence from the mobile station 20 by way of receiving uplink protocol data units from the mobile station 20.)

Figure 2:
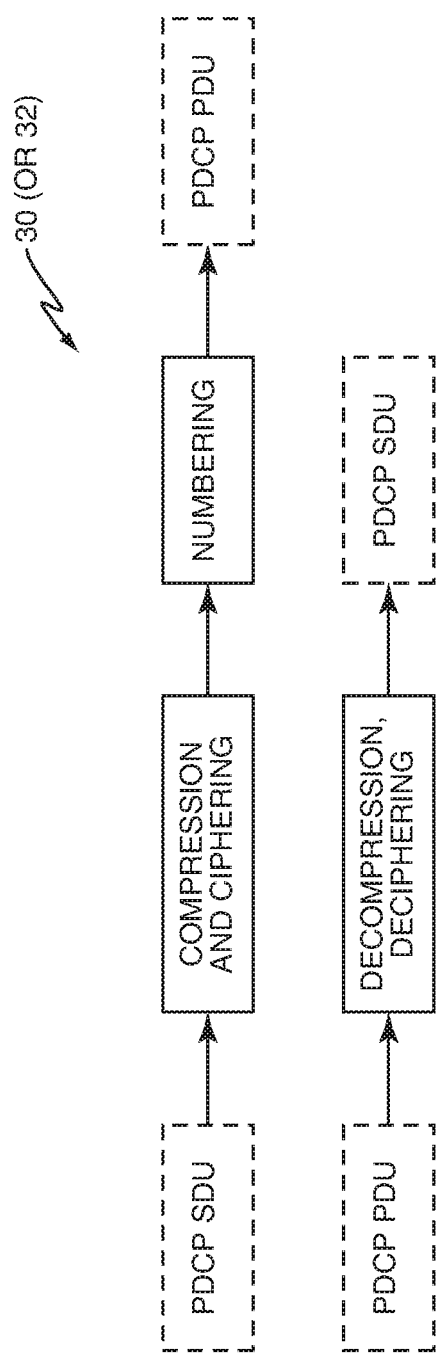
FIG. 2 is a block diagram of functional processing associated Packet Data Convergence Protocol (PDCP) processing.

In any case, to better understand protocol and service data units using PDCP as an example, FIG. 2 illustrates that each base station 16 includes a PDCP processor 30, which may be a functional processing element implemented in software, hardware, or any combination thereof. (The mobile station 20 includes a like PDCP processor 32.) One sees that functionally the PDCP processor 30 forms downlink PDCP protocol data units for over-the-air transmission to the mobile station 20 by applying ciphering and (header) compression to PDCP service data units incoming from the gateway 18. Notably, the PDCP processor 30 also generates/assigns a sequence number to each PDCP protocol data unit to enable sequential ordering and processing of PDCP service data units at the mobile station 20. The PDCP processor 32 at the mobile station 20 thus receives downlink PDCP protocol data units from a base station 16, and decompresses/deciphers them to obtain corresponding PDCP service data units. The receiver operation also includes the removal of sequence number information.

Similarly, one sees that functionally the PDCP processor 32 forms uplink PDCP protocol data units for over-the-air transmission to a base station 16 by applying ciphering and optionally applying header compression to PDCP service data units representing desired transmit information. Notably, the PDCP processor 32 also generates/assigns a sequence number to each PDCP protocol data unit to enable sequential ordering and processing of PDCP service data units at the base station 16. The base station 16 thus receives uplink PDCP protocol data units from the mobile station 20, and its PDCP processor 30 decompresses/deciphers them to obtain corresponding PDCP service data units, where the sequence numbering has been removed. For further details and examples, one may refer to TS 36.323, version 8.0.0, as released by the 3GPP.

Figure 3:
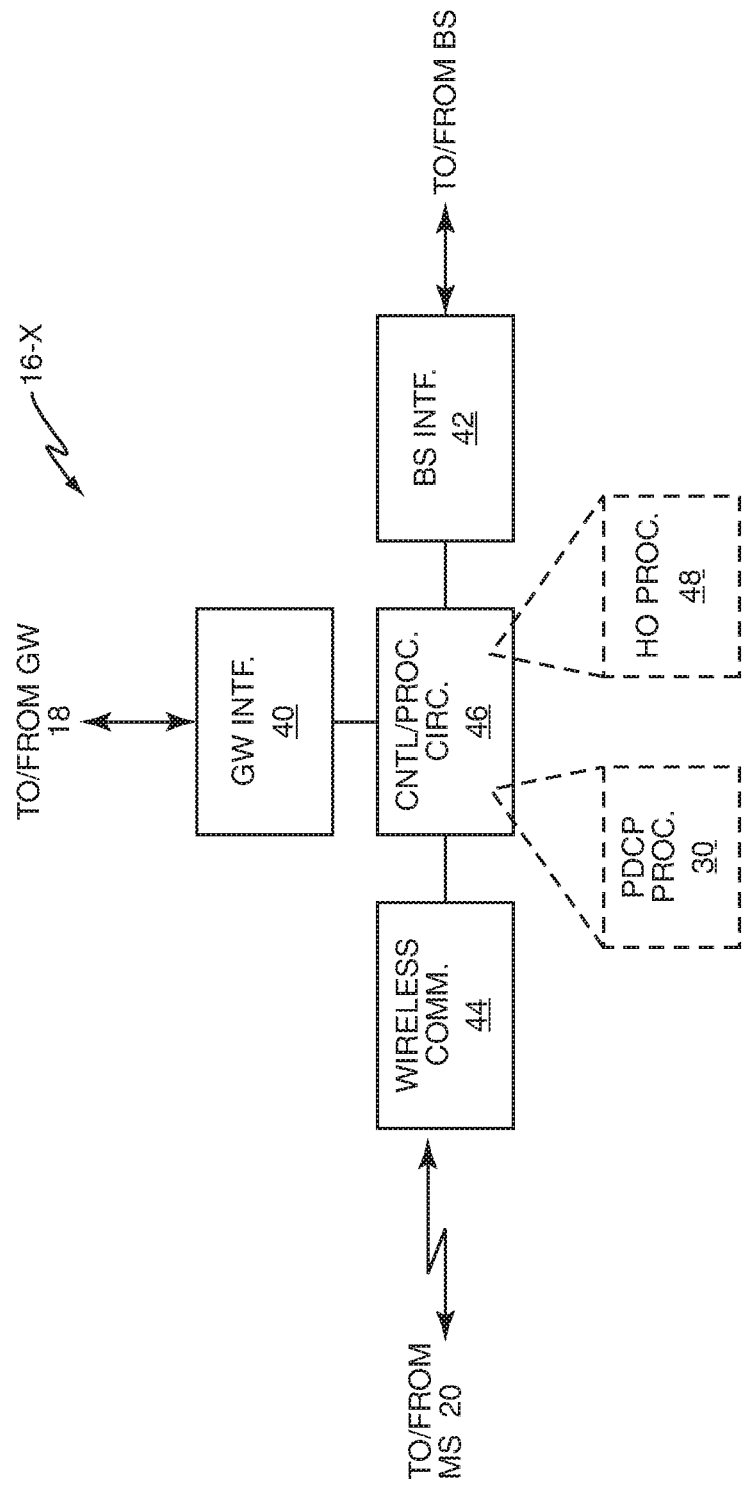
FIG. 3 is a block diagram of one embodiment of a source and/or target base station, according to seamless handover teachings taught herein.

Of particular interest with respect to PDCP processing, the base stations 16-1 and 16-2 are configured to support seamless handover of the mobile station 20. In general, it will be understood by those skilled in the art that the base stations 16 represent complex computation platforms that provide a comprehensive set of communication control and call processing functions and that such systems are subject to wide variation in terms of their implementation. FIG. 3 thus will be understood as a non-limiting example of a functional implementation of a base station 16 in support of seamless handover processing.

In FIG. 3, the base station 16-*x* (where "x" denotes "1" or "2" with respect to FIG. 1) includes a number of functional circuits or sub-systems, including a gateway interface circuit 40, a base station interface 42, which may be considered to be part of the logical inter-base-station interface 24 introduced in FIG. 1, a wireless communication interface 44 for wireless communications with the mobile station 20 (and other mobile stations), and control/processing circuits 46 for carrying out communication control and processing, and for carrying on general base station operations.

The control/processing circuits 46 are, for example, microprocessor-based circuits, which may operate according to one or more computer programs stored in a computer-readable medium within the base station 16-*x*. Of course, it should be understood that the control/processing circuits 46 may comprise hardware, software, or any combination thereof. With that in mind, the control/processing circuits 46 include a handover processor 48, along with the earlier-illustrated PDCP processor 30, which, again, may be implemented in software, hardware, or any combination thereof. Those skilled in the art will recognize that the PDCP processor 30 may comprise part of a larger layered protocol stack, and that its operations are coordinated with Radio Link Control (RLC) and Medium Access Control (MAC) processing.

The base station 16-*x* selectively operates as a source base station, e.g., 16-1 in FIG. 1, and as a target base station, e.g., 16-2 in FIG. 1. Referring again to reference numbers in FIG. 1, and with regard to target base station operation, the base station 16-2 implements a method of supporting seamless handover of mobile stations 20 from the source base station 16-1. In one or more embodiments, the method is characterized by, during handover execution, receiving at the target base station 16-2 PDCP service data units 26 and sequence number information 28 forwarded from the source base station 16-1, where the forwarded service data units 26 and sequence number information 28 correspond to service data units being held at the source base station 16-1 for sequential transfer to the core network 14, and where the forwarded sequence number information indicates the sequence numbers corresponding to the forwarded service data units. The method is further characterized by reordering the forwarded PDCP service data units as needed at the target base station 16-2 for sequential transfer from the target base station to the associated core network.

In at least one embodiment, reordering the forwarded PDCP service data units as needed at the target base station 16-2 for sequential transfer from the target base station 16-2 to the associated core network 14 includes the target base station 16-2 identifying missing service data units based on the forwarded sequence number information 28, and requesting retransmission by the mobile station 20 of the protocol data units corresponding to the missing service data units. The method may be further characterized in that the forwarded sequence number information 28 indicates sequence numbers corresponding to the forwarded service data units, and further indicates a sequence number corresponding to the PDCP service data unit most recently transferred from the source base station 16-1 to the associated core network 14. The sequence number information 28 may also include sequence numbers of the service data units that are missing at the source base station 16-1.

Such information may be transmitted in the form of a reception status message sent from the source base station 16-1 to the target base station 16-2 during handover execution. In at least one embodiment, the forwarded sequence number information 28 further indicates a sequence number of the PDCP protocol data unit corresponding to the PDCP service data unit most recently transferred from the source base station 16-1 to the associated core network 14. That is, the forwarded sequence number information may indicate sequence numbers of the PDCP protocol data units corresponding to the forwarded PDCP service data units 26, and may further indicate the highest sequence number corresponding to PDCP service data units already transferred in proper sequence from the source base station 16-1 to the associated core network 14. As noted earlier, instead of indicating the sequence number corresponding to the service data unit most recently transferred from the source base station 16-1 to the associated core network 14, the forwarded sequence number information may indicate the next higher sequence number.

The method may be further characterized in that the target base station 16-2 processes the forwarded sequence number information 28 to identify PDCP protocol data units received at the target base station 16-2 from the mobile station 20 that are duplicative with regard to PDCP service data units previously transferred from the source base station 16-1 to the associated core network 14, and processes the forwarded sequence number information 28 to identify PDCP protocol data units for which retransmission by the mobile station 20 is required for reordering of the forwarded PDCP service data units 26, for sequential transfer from the target base station 16-2 to the associated core network 14, e.g., the gateway 18.

The method may be further characterized in that the forwarded PDCP service data units 26 are successfully deciphered versions of corresponding PDCP protocol data units that were received out of sequence at the source base station 16-1 at or before initiation of handover and have not been transferred from the source base station 16-1 to the associated core network 14. If header compression is used, then the forwarded service data units may be decompressed. In this regard, then, it is not necessary for the target base station 16-2 to have knowledge of ciphering keys in use at the source base station 16-1, nor is it necessary for the source base station 16-1 to transfer header compression state information to the target base station 16-2.

The complementary seamless handover method at the source base station 16-1 is characterized by, during handover execution, forwarding from the source base station 16-1 to the target base station 16-2 PDCP service data units 26 and sequence number information 28 corresponding to PDCP protocol data units received out of sequence at the source base station 16-1 and not yet transferred by the source base station 16-1 to the associated core network 14. In other words, the source base station 16-1 forwards the service data units it is holding for sequential transfer. As noted, such transfer may be further characterized in that the forwarded PDCP service data units 26 are successfully deciphered versions of the PDCP protocol data units received out of sequence at the source base station 16-1 and not yet transferred by the source base station 16-1 to the associated core network 14. Correspondingly, the forwarded sequence number information 28 indicates the sequence numbers of such out-of-sequence PDCP protocol data units.

Still further, the seamless handover method as implemented at the source base station 16-1 may be characterized in that the source base station 16-1 further includes in the forwarded sequence number information 28 an indication of the sequence number for the PDCP protocol data unit corresponding to the PDCP service data unit most recently transferred from the source base station 16-1 to the associated core network 14, or an indication of the sequence number corresponding to the last in sequence received service data unit. Alternatively, it may transfer the sequence number corresponding to the service data unit next expected to be transferred from the source base station 16-1 to the associated core network 14.

Thus, according to the example illustration of FIG. 3, seamless source-to-target handover is supported in one or more embodiments by configuring a target base station 16-2 to include a (base station) interface 42 and a handover processor 48. In at least one such embodiment, the interface 42 is operative to receive PDCP service data units 26 and sequence number information 28 forwarded from the source base station 16-1, where the forwarded service data units 26 are those service data units being held at the source base station 16-1 for sequential transfer to the associated core network 14, and the forwarded sequence number information indicates corresponding sequence numbers for the forwarded service data units. Correspondingly, the handover processor 48 is operative to reorder the forwarded PDCP service data units as needed at the target base station 16-2, for sequential transfer from the target base station 16-2 to the associated core network 14.

For complementary source base station operations, the handover processor 48 and the associated interface 42 provide for forwarding from the source base station 16-1 to the target base station 16-2 PDCP service data units 26 and sequence number information 28. As noted, the forwarded PDCP service data units 26 and sequence number information 28 correspond to PDCP protocol data units received out of sequence at the source base station 16-1 and not yet transferred by the source base station 16-1 to the associated core network 14.

Of course, the mobile station 20 also includes one or more processing circuits, e.g., a microprocessor-based system that implements the PDCP processor 32 shown in FIG. 1, along with being configured to support seamless handover from the source base station 16-1 to the target base station 16-2. In at least one embodiment, the mobile station 20 includes one or more processing circuits that are characterized by being operative to retransmit PDCP protocol data units for the missing PDCP service data units, responsive to retransmission requests received from the target base station, and using new ciphering and header compression states to regenerate the PDCP protocol data units for retransmission using corresponding PDCP service data units buffered at the mobile station 20. In this manner, the target base station 16-2 uses the forwarded sequence number information 28 at least in part to identify missing service data units for which protocol data units retransmission by the mobile station 20 is required. In this sense, the retransmission(s) are required so that the handover processor 48 in the target base station 16-2 can reorder the forwarded PDCP service data units 26, and transfer them to the associated core network 14 in the correct sequence.

Further, in at least one embodiment, the mobile station 20 is configured for supporting seamless handover from a source base station 16-1 to a target base station 16-2, and is characterized by a handover processor that is operative to regenerate new protocol data units for missing service data units and transmit the regenerated protocol data units responsive to signaling from the target base station 16-2 that indicates which service data units are missing at the target base station 16-2, or equivalently indicates which service data units have been successfully received at the target base station 16-2.

The regenerated protocol data units are regenerated from corresponding service data units buffered at the mobile station 20. In at least one such embodiment, the mobile station 20 is further characterized in that the regenerated protocol data units are regenerated using at least one of new ciphering states and new header compression states. Further, in at least one embodiment, the mobile station 20 is further characterized in that the mobile station 20 forgoes retransmission of those service data units that are indicated by the target base station 16-2 as having been successfully received.

With the above in mind, then, those skilled in the art will appreciate that the teachings herein include, in one or more embodiments, sending information, including forwarded service data units, from a first base station, e.g., source base station 16-1, to a second base station, e.g., target base station 16-2, for seamless handover of a mobile station 20. Here, the base stations 16 and the mobile station 20 represent respective end-points of a protocol controlled link, e.g., a PDCP link. In at least one aspect, the teachings herein address service data unit reordering at the target base station 16-2 based on sending information, e.g., a status message, from the source base station 16-1 to the target base station 16-2. In at least one embodiment, the message includes information about the service data units or protocol data units that have been successfully received at the source base station 16-1. This information can be used in the target base station 16-2 to request the retransmission of missing service data units after the handover is completed. The same status information can be used for duplicate detection in the target base station 16-2, in case the target base station 16-2 receives data that has already been delivered by the source base station 16-1 to the gateway 18.

In at least one embodiment, uplink mobility as part of seamless handover comprises sending all cumulatively correctly received data—i.e., all sequentially received or successfully reordered PDCP service data units—is sent via an "S1 interface" to gateway 18 in the associated core network 14. The gateway 18 comprises, in an E-UTRAN embodiment, a System Architecture Evolution (SAE) Gateway (GW).

Upon initiation of handover, the source base station 16-1 sends a status message to the target base station 16-2 via the logical interface 24 connecting these two base stations. (In LTE, this interface is named the "X2" interface. (In case the source and target base stations are not logically interconnected with the "X2" interface, then the aforementioned communication including data forwarding and status message transfer may be relayed via the core network 14, i.e., by using the two logical S1 interfaces between the two base stations 16 and the core network 14.) The status message describes the reception status of service data units in the source base station 16-1. Note, that the status message does not necessarily represent the status at the mobile station 20, which is the data sender for uplink communications.

The status message, which may be embodied in or otherwise accompany the forwarded sequence number information 28 described earlier herein, may include the status of which service data units have been forwarded to the gateway 18 by the source base station 16-1 over the S1 interface. Further, as noted, the source base station 16-1 also forwards those service data units 26 that have been received in the source base station 16-1 but not yet delivered to the gateway 18, i.e., those service data units being held in the source base station 16-1 because they are not received in-sequence and are waiting reordering at the source base station 16-1. As explained earlier, such service data units are temporarily buffered at the source base station 16-1 rather than being transferred to the gateway 18.

Assuming these buffered service data units are forwarded from the source base station 16-1 to the target base station 16-2, the mobile station 20 retransmits protocol data units to the target base station 16-2 that correspond to the missing service data units. The mobile station 20 performs such retransmission by, for example, generating new PDCP protocol data units for the missing PDCP service data units missing at the target base station 16-2. Note that the mobile station 20 generally retains service data units while awaiting acknowledgment for the correspondingly transmitted protocol data units, and these retained copies can be used for protocol data unit regeneration and retransmission.

The mobile station 20 also is, in one or more embodiments, configured to use new ciphering and header compression states for retransmitting the missing PDCP service data units. The information included in the status message sent from the source base station 16-1 to the target base station 16-2 can be used by the target base station 16-2 to request retransmissions by the mobile station 20, using known ARQ mechanisms (e.g. in the RLC protocol).

The status message in one or more embodiments includes at least a sequence number (SN) that indicates up to which SN the data has been correctly received at the source base station 16-1. The target base station 16-2 can be configured to determine which service data units are missing based on the sequence numbers corresponding to the forwarded service data units 26. However, in at least one embodiment, the source base station 16-1 explicitly indicates the missing data, such as in the form of a data list or bit-map. In addition to the ARQ related information, the status report may also include information on the protocol data units that were (or were not) successfully decompressed and/or deciphered. Doing so allows the target base station 16-2 to request retransmission of service data units that were correctly received in the source in an ARQ sense at the source base station 16-1 but were not successfully decompressed or deciphered, i.e. the corresponding protocol data units were successfully received, but the source base station 16-1 may have failed in processing service data units from the received protocol data units.

Figure 4:
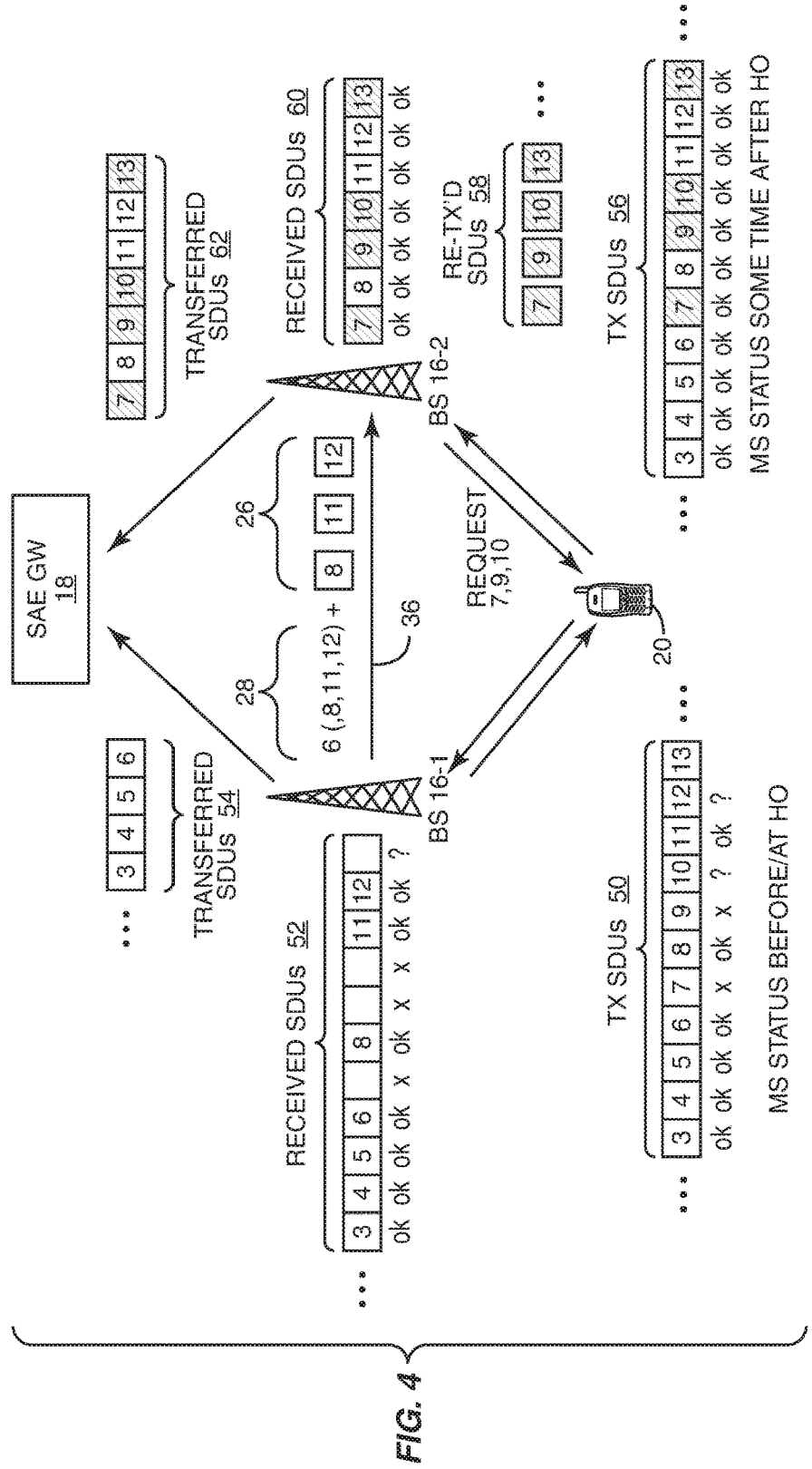
FIG. 4 is a block diagram illustrating an example of protocol and service data unit processing and related statuses before, during, and after handover execution according to seamless handover as taught herein.

By way of non-limiting example, FIG. 4 "logically" illustrates a seamless handover of the mobile station 20 from the source base station 16-1 to the target base station 16-2. The diagram is a "logical" illustration in the sense that it shows the logical condition of transmit and receive statuses for PDCP service data units transmitted from the mobile station 20 to the source base station 16-1 and/or to the target base station 16-2. These illustrated status indicators may or may not represent the literal data structures used in the mobile station 20 and in the base stations 16 for managing PDCP-based uplink communications, but rather are for purposes of discussion.

In FIG. 4, the source and target base stations 16-1 and 16-2, respectively, operate according to the teaching presented herein for seamless handover. For discussion purposes, it is assumed that the mobile station 20 has transmitted a number of PDCP protocol data units to the source base station 16-1, with some of them received successfully and some of them not. The illustrated status indicators 50 indicate the status at the mobile station 20 of those transmitted PDCP service data units, and they indicate that PDCP protocol data units having sequence numbers 3-13 have been transmitted from the mobile station 20 to the source base station 16-1 in advance of the handover.

However, as noted, not all of the PDCP protocol data units were successfully received at the source base station 16-1, and the received status indicators 52 at the source base station 16-1 illustrate an example case, wherein PDCP service data units have been successfully received (including successful decompression/deciphering) for PDCP protocol data units having sequence numbers 3, 4, 5, 6, 8, 11, and 12. Contrastingly, PDCP service data units have not been successfully received for sequence numbers 7, 9, and 10. As such, the PDCP service data units 8, 11, and 12 are considered as having been received out-of-sequence. Also of note in FIG. 4 are the transferred PDCP service data units 54. These service data units 54 represent those PDCP service data units already transferred from the source base station 16-1 to the associated core network 14 (e.g., gateway 18) before handover execution.

Thus, during handover execution, the source base station 16-1 forwards the PDCP service data units 26 that were received out of sequence and are awaiting reordering for transfer to the gateway 18. In this example, the forwarded PDCP service data units are 8, 11, and 12. That is, the forwarded PDCP service data units are those corresponding to the 8th, 11th, and 12th PDCP protocol data units in the sequence, which were successfully received at the source base station 16-1, but received out of sequence. As already noted, the source base station 16-1 forwards the sequence number information 28 corresponding to these forwarded PDCP service data units, and, in one or more embodiments, the sequence number information 28 includes an indication of the highest sequence number of PDCP service data units already transferred up to the gateway 18—i.e., the most recently sequentially transferred PDCP service data unit. In this example, that value is "6." Different ways of coding this information can be applied, e.g. where the most recently sequentially transferred PDCP service data unit may be indicated ("6"), or alternatively, the next PDCP service data unit to be sequentially transferred is indicated ("7").

In complementary fashion, the target base station 16-2 uses the received sequence number information 28 to request selective retransmissions by the mobile station 20, while avoiding unnecessary retransmissions and thereby improving handover efficiency. More particularly, the target base station 16-2 processes the received sequence number information 28, which may include or comprise the status message information discussed earlier herein, to identify the missing PDCP protocol data units that the mobile station 20 needs to retransmit to allow the target base station 16-2 to properly sequence the forwarded PDCP service data units 26 for transfer to the gateway 18.

Thus, the status indicators 56 represent the status of the mobile station 20 sometime after handover, assuming that retransmission requests (e.g., ARQ procedures) at the target base station 16-2 have prompted the mobile station 20 to retransmit the missing data. That is, one sees that the missing data for sequence numbers 7, 9, 10, and 13 has been successfully retransmitted in the form of PDCP protocol data units from the mobile station 20 to the target base station 16-2. The PDCP service data units 58 corresponding to the retransmitted PDCP protocol data units are explicitly shown on the uplink to the target base station 16-2. Note that hatching is used to indicate retransmitted data.

Continuing with the example, the received status indicators 60 at the target base station 16-2 illustrate that the target base station 16-2 has obtained the missing data needed to properly reorder the forwarded PDCP service data units 26. Thus, the target base station 16-2 transfers the retransmitted PDCP service data units and the forwarded PDCP service data units 26 in proper sequence order to the gateway 18. The set of transferred PDCP service data units 62 indicates that transfer.

Of course, FIG. 4 stands as a representative example, and is not limiting. Indeed, the present invention is not limited to the foregoing discussion and accompanying drawings. Instead, the present invention is limited only by the following claims and their legal equivalents.

What is claimed is:

1. A method in a mobile station configured to support handover from a source base station to a target base station, the method comprising:
   receiving signaling from the target base station that indicates Packet Data Convergence Protocol (PDCP) protocol data units which have been successfully received at the target base station;
   responsive to the signaling, generating further PDCP protocol data units for missing PDCP service data units from corresponding PDCP service data units buffered at the mobile station, the generating comprising using a different header compression state from that which was used for the missing PDCP service data units and ciphering specific to a connection with the target base station; and
   transmitting the further PDCP protocol data units to the target base station.

2. The method of claim 1, further comprising forgoing transmission of PDCP service data units that are indicated by the target base station as having been successfully received.

3. The method of claim 1, wherein generating the further PDCP protocol data units is further responsive to performing a handover from the source base station to the target base station.

4. The method of claim 3, wherein performing the handover is responsive to transmitting the missing PDCP service data units to the source base station.

5. The method of claim 1, wherein the signaling from the target base station comprises Automatic Repeat request (ARQ) signaling.

6. The method of claim 1, wherein the mobile station is comprised in a Long Term Evolution (LTE) communication network.

7. The method of claim 1, further comprising transmitting a PDCP protocol data unit to a base station that transfers a corresponding PDCP service data unit to a core network.

8. The method of claim 7, wherein the PDCP protocol data unit is one of the PDCP protocol data units successfully received at the target base station or one of the further PDCP protocol data units.

9. A mobile station configured to support handover from a source base station to a target base station, the mobile station comprising:
   a wireless communication interface;
   processing circuitry connected to the wireless communication interface, the processing circuitry being configured to:
     receive signaling from the target base station that indicates Packet Data Convergence Protocol (PDCP) protocol data units which have been successfully received at the target base station;
     responsive to the signaling, generate further PDCP protocol data units for missing PDCP service data units from corresponding PDCP service data units buffered at the mobile station; and
     transmit, via the wireless communication interface, the further PDCP protocol data units to the target base station;
     wherein to generate the further PDCP protocol data units, the processing circuitry is configured to use a different header compression state from that which was used for the missing PDCP service data units and ciphering specific to a connection with the target base station.

10. The mobile station of claim 9, wherein the processing circuitry is further configured to forgo transmission of PDCP service data units that are indicated by the target base station as having been successfully received.

11. The mobile station of claim 9, wherein the processing circuitry is configured to generate the further PDCP protocol data units further responsive to performing a handover from the source base station to the target base station.

12. The mobile station of claim 11, wherein the processing circuitry is configured to perform the handover responsive to transmitting the missing PDCP service data units to the source base station via the wireless communication interface.

13. The mobile station of claim 9, wherein the signaling from the target base station comprises Automatic Repeat request (ARQ) signaling.

14. The mobile station of claim 9, wherein the mobile station is comprised in a Long Term Evolution (LTE) communication network.

15. The mobile station of claim 9, wherein the processing circuitry is further configured to transmit, via the wireless communication interface, a PDCP protocol data unit to a base station that transfers a corresponding PDCP service data unit to a core network.

16. The mobile station of claim 15, wherein the PDCP protocol data unit is one of the PDCP protocol data units successfully received at the target base station or one of the further PDCP protocol data units.

17. A non-transitory computer readable medium storing a computer program product for controlling a programmable mobile station configured to support handover from a source base station to a target base station, the computer program product comprising software instructions that, when executed by processing circuitry of the programmable mobile station, cause the programmable mobile station to:
   receive signaling from the target base station that indicates Packet Data Convergence Protocol (PDCP) protocol data units which have been successfully received at the target base station;
   responsive to the signaling, generate further PDCP protocol data units for missing PDCP service data units from corresponding PDCP service data units buffered at the mobile station, the generating comprising using a different header compression state from that which was used for the missing PDCP service data units and ciphering specific to a connection with the target base station; and transmit the further PDCP protocol data units to the target base station.

18. The non-transitory computer readable medium of claim 17, wherein the software instructions further cause the programmable mobile station to forgo transmission of PDCP service data units that are indicated by the target base station as having been successfully received.

19. The non-transitory computer readable medium of claim 17, wherein the software instructions cause the programmable mobile station to generate the further PDCP protocol data units further responsive to performing a handover from the source base station to the target base station.

20. The non-transitory computer readable medium of claim 11, wherein the signaling from the target base station comprises Automatic Repeat request (ARQ) signaling.

\* \* \* \* \*